US010830132B2

(12) United States Patent
Wang et al.

(10) Patent No.: US 10,830,132 B2
(45) Date of Patent: Nov. 10, 2020

(54) MICRO THERMAL IMAGING SYSTEM FOR TURBINE ENGINES

(71) Applicant: General Electric Company, Schenectady, NY (US)

(72) Inventors: Guanghua Wang, Clifton Park, NY (US); Todd Garrett Wetzel, Rexford, NY (US); Jason Edward Dees, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 468 days.

(21) Appl. No.: 15/142,539

(22) Filed: Apr. 29, 2016

(65) Prior Publication Data

US 2017/0314464 A1   Nov. 2, 2017

(51) Int. Cl.
  *F01D 17/02*   (2006.01)
  *F02C 6/00*   (2006.01)
  *F01D 21/00*   (2006.01)
  *H04N 5/33*   (2006.01)

(52) U.S. Cl.
  CPC ............... *F02C 6/00* (2013.01); *F01D 17/02* (2013.01); *F01D 21/003* (2013.01); *H04N 5/33* (2013.01); *F05D 2220/323* (2013.01); *F05D 2230/60* (2013.01); *F05D 2270/303* (2013.01);
  (Continued)

(58) Field of Classification Search
  CPC ......... G01J 5/0088; G01J 5/042; F01D 17/02; F01D 17/085; F05D 2270/303
  See application file for complete search history.

(56) References Cited

U.S. PATENT DOCUMENTS 3,623,368 A * 11/1971 Decker ................. F01D 17/085
 374/125
4,797,006 A *  1/1989 Masom ................. G01J 5/0022
 356/43

(Continued)

FOREIGN PATENT DOCUMENTS

CH   708 904 A2   5/2015
CH   708904 A2   5/2015
(Continued)

OTHER PUBLICATIONS

Omega Engineering, Miniature Infrared Temperature Sensor for High Temperature Targets and Metals, Apr. 2, 2016, https://www.omega.com/pptst/OS-MINI22.html, pp. 1 and 5-8.*

(Continued)

*Primary Examiner* — Steven M Sutherland
(74) *Attorney, Agent, or Firm* — The Small Patent Law Group LLC; Mary D. Lawlor (57) ABSTRACT

A turbine engine includes a compressor section, a combustor section fluidly coupled to the compressor section, a turbine section fluidly coupled to the combustor section, and a drive shaft coupled to the turbine section and the compressor section. The turbine engine also includes a plurality of internal components coupled to one of the compressor section, the combustor section, the turbine section, and the drive shaft. The turbine engine also includes at least one micro infrared sensor coupled to at least one of the plurality of internal components. The micro infrared sensor is configured to detect a surface temperature of the plurality of internal components.

17 Claims, 4 Drawing Sheets

(52) U.S. Cl.
CPC .... *F05D 2270/80* (2013.01); *F05D 2270/804* (2013.01); *Y02T 50/671* (2013.01)

(56) References Cited

U.S. PATENT DOCUMENTS

| | | | |
|---|---|---|---|
| 4,934,137 A * | 6/1990 | MacKay | F01D 17/085 |
| | | | 374/125 |
| 6,364,524 B1 * | 4/2002 | Markham | G01J 5/0022 |
| | | | 374/131 |
| 6,367,969 B1 | 4/2002 | Ringermacher et al. | |
| 6,517,236 B2 | 2/2003 | Sun et al. | |
| 6,701,714 B2 | 3/2004 | Burd et al. | |
| 6,796,709 B2 | 9/2004 | Choi | |
| 7,388,204 B2 | 6/2008 | Key et al. | |
| 7,422,365 B2 | 9/2008 | Chamberlain et al. | |
| 8,749,629 B2 | 6/2014 | Baleine et al. | |
| 9,250,136 B1 * | 2/2016 | Gustavsson | G01J 5/0856 |
| 9,706,152 B2 | 7/2017 | Griffith | |
| 2004/0267850 A1 * | 12/2004 | Bird | G01J 5/0022 |
| | | | 708/446 |
| 2011/0211940 A1 | 9/2011 | George et al. | |
| 2011/0280279 A1 * | 11/2011 | Gregory | F01D 17/085 |
| | | | 374/152 |
| 2012/0128468 A1 * | 5/2012 | Schleif | F01D 21/003 |
| | | | 415/118 |
| 2012/0153157 A1 * | 6/2012 | Estevadeordal | G01J 5/0088 |
| | | | 250/339.04 |
| 2013/0118183 A1 * | 5/2013 | Wang | F01D 17/08 |
| | | | 60/783 |
| 2013/0342360 A1 | 12/2013 | Bevly, III | |
| 2014/0133994 A1 * | 5/2014 | Bosselmann | F01D 17/085 |
| | | | 416/223 R |
| 2015/0083919 A1 | 3/2015 | Wind et al. | |

FOREIGN PATENT DOCUMENTS

| | | |
|---|---|---|
| CN | 102782258 B | 1/2015 |
| EP | 3 182 085 A1 | 6/2017 |
| JP | 2011179493 | 9/2011 |
| JP | 2015524036 | 8/2015 |

OTHER PUBLICATIONS

Douglas J et al., "An integrated approach to the application of high bandwidth optical pyrometry to turbine blade surface temperature mapping", Instrumentation in Aerospace Simulation Facilities, 1999. ICIASF 99. 18th International Congress on, pp. 4/1-4/6, 1999, Toulouse.

Extended European Search Report and Opinion issued in connection with corresponding EP Application No. 17168277.6 dated Sep. 29, 2017.

Office Action issued in connection with corresponding CA Application No. 2965292 dated May 24, 2018.

Machine translation and first office action and search issued in connection with corresponding CN Application No. 201710292751.9 dated Dec. 17, 2018 (office action translation is not available).

Chinese office action dated Sep. 12, 2019 for related application No. CN201710292751.9.

Chinese office action dated Apr. 20, 2019 for related application No. CN201710292751.9.

* cited by examiner

MICRO THERMAL IMAGING SYSTEM FOR TURBINE ENGINES

BACKGROUND

The field of the disclosure relates generally to a turbine engine, and more particularly, to a micro thermal imaging system for a gas turbine engine.

Gas turbine engines typically include a compressor and a turbine, each with a series of alternating stator blades and rotor blades. Many known systems measure the temperature at the inlet and outlet of both the compressor and the turbine, and some known systems measure the temperature of internal components of the gas turbine engine. Some known systems include a thermocouple sensor to measure temperature of the internal components. However, known thermocouple sensors only gather data from discrete points inside the gas turbine engine, which may not provide enough data for an adequate thermal analysis of the gas turbine engine. Alternatively, some known systems employ infrared camera to measure temperature of the internal components from locations external to the gas turbine engine through a borescope. However, these known systems also limit the amount of data that can be gathered about the internal components. Other known systems employ fiber optic sensors to measure temperature. However, known fiber optics do not provide sufficient resolution to consistently measure temperature of the internal components.

BRIEF DESCRIPTION

In one aspect, a turbine engine is provided. The turbine engine includes a compressor section, a combustor section fluidly coupled to the compressor section, a turbine section fluidly coupled to the combustor section, and a drive shaft coupled to the turbine section and the compressor section. The turbine engine also includes a plurality of internal components coupled to one of the compressor section, the combustor section, the turbine section, and the drive shaft. The turbine engine also includes at least one micro infrared sensor coupled to at least one of the plurality of internal components. The micro infrared sensor is configured to detect a surface temperature of the plurality of internal components.

In another aspect, a micro thermal imaging system is provided. The micro thermal imaging system includes at least one micro infrared sensor positioned within a turbine engine. The sensor is configured to detect a temperature of a plurality of components within the rotary machine. The micro thermal imaging system further includes a controller coupled to the at least one micro infrared sensor, and a user computing device coupled to the controller. The controller is configured to receive temperature data from the at least one micro infrared sensor. The user computing device is configured to convey temperature data to a user.

In yet another aspect, a method of manufacturing a turbine engine is provided. The method includes coupling a compressor section and a combustor section in fluid communication, and coupling a turbine section and the combustor section in fluid communication. The method further includes coupling a drive shaft to the turbine section and the compressor section. The method further includes coupling at least one micro infrared sensor to at least one internal component of one of the compressor section, combustor section, turbine section, and drive shaft.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The micro thermal imaging system described herein facilitates the measurement of the temperature of various components of a gas turbine engine. The system described herein includes a plurality of micro infrared cameras embedded into components of the gas turbine engine. In at least one embodiment, the system includes a plurality of micro infrared cameras coupled to moving components of the gas turbine engine. As the moving components rotate or translate, the micro infrared cameras take data on the thermal activity of the gas turbine engine, and provide a nearly complete map of the surface temperature of the various components. The data gathered can then be wirelessly transmitted to an external receiver for analysis, providing thermal feedback to a user in near real-time.

Figure 1:
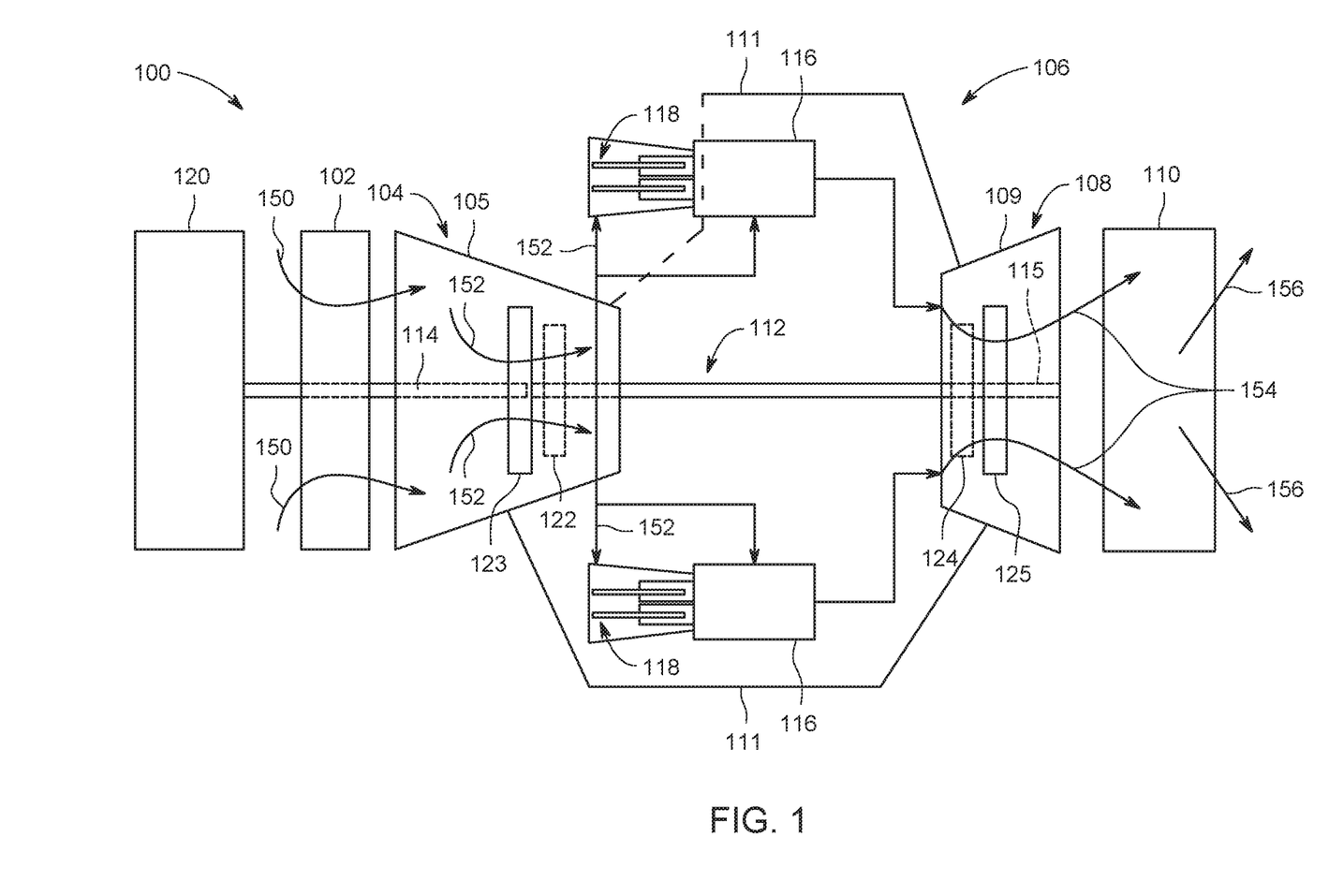
FIG. 1 is a schematic view of an exemplary turbomachine, i.e., a gas turbine engine.

FIG. 1 is a schematic view of a rotary machine 100, i.e., a turbomachine, and more specifically, a turbine engine. In the exemplary embodiment, turbine engine 100 is a gas turbine engine. Alternatively, turbine engine 100 is any other turbine engine and/or rotary machine, including, without limitation, a steam turbine engine, an aircraft engine, a wind turbine, and a compressor. In the exemplary embodiment, gas turbine engine 100 includes an air intake section 102, and a compressor section 104 that is coupled downstream from, and in flow communication with, intake section 102. Compressor section 104 is enclosed within a compressor casing 105. A combustor section 106 is coupled downstream from, and in flow communication with, compressor section 104, and a turbine section 108 is coupled downstream from, and in flow communication with, combustor section 106. Turbine section 108 is enclosed within a turbine casing 109 and includes an exhaust section 110 that is downstream from turbine section 108. A combustor housing 111 extends about combustor section 106 and is coupled to compressor casing 105 and turbine casing 109. Moreover, in the exemplary embodiment, turbine section 108 is coupled to compressor section 104 via a drive shaft 112 that includes, without limitation, a compressor rotor, or drive shaft 114 and a turbine rotor, or drive shaft 115.

In the exemplary embodiment, combustor section 106 includes a plurality of combustor assemblies, i.e., combustors 116 that are each coupled in flow communication with compressor section 104. Combustor section 106 also includes at least one fuel nozzle assembly 118. Each combustor 116 is in flow communication with at least one fuel nozzle assembly 118. Moreover, in the exemplary embodiment, turbine section 108 and compressor section 104 are rotatably coupled to a load 120 via drive shaft 114. For example, load 120 may include, without limitation, an electrical generator and/or a mechanical drive application, e.g., a pump. Alternatively, gas turbine engine 100 may be an aircraft engine. In the exemplary embodiment, compressor section 104 includes at least one compressor blade assembly 122, i.e., blade 122 and at least one adjacent stationary vane assembly 123.

Also, in the exemplary embodiment, turbine section 108 includes at least one turbine blade assembly 124, i.e. at least one stage of turbine blades, and at least one adjacent stationary nozzle assembly 125, i.e. at least one stage of stators. Each compressor blade assembly 122 and each turbine blade assembly 124 is coupled to drive shaft 112, or, more specifically, compressor drive shaft 114 and turbine drive shaft 115.

In operation, intake section 102 channels fluid 150 towards compressor section 104. In the exemplary embodiment, fluid 150 is air. In alternative embodiments, fluid 150 is any fluid that enables turbine engine 100 to function as described herein. Compressor section 104 compresses fluid 150 to higher pressures and temperatures prior to discharging compressed fluid 152 towards combustor section 106. Compressed fluid 152 is channeled to fuel nozzle assembly 118, mixed with fuel (not shown), and burned within each combustor 116 to generate combustion fluid 154 that is channeled downstream towards turbine section 108. Combustion fluid 154 generated within combustors 116 is channeled downstream towards turbine section 108. After impinging at least one turbine blade assembly 124, thermal energy is converted to mechanical rotational energy that drives drive shaft 112. Turbine section 108 drives compressor section 104 and/or load 120 via drive shafts 114 and 115, and exhaust 156 is discharged through exhaust section 110 to an ambient sink (not shown), such as the atmosphere.

Figure 2:
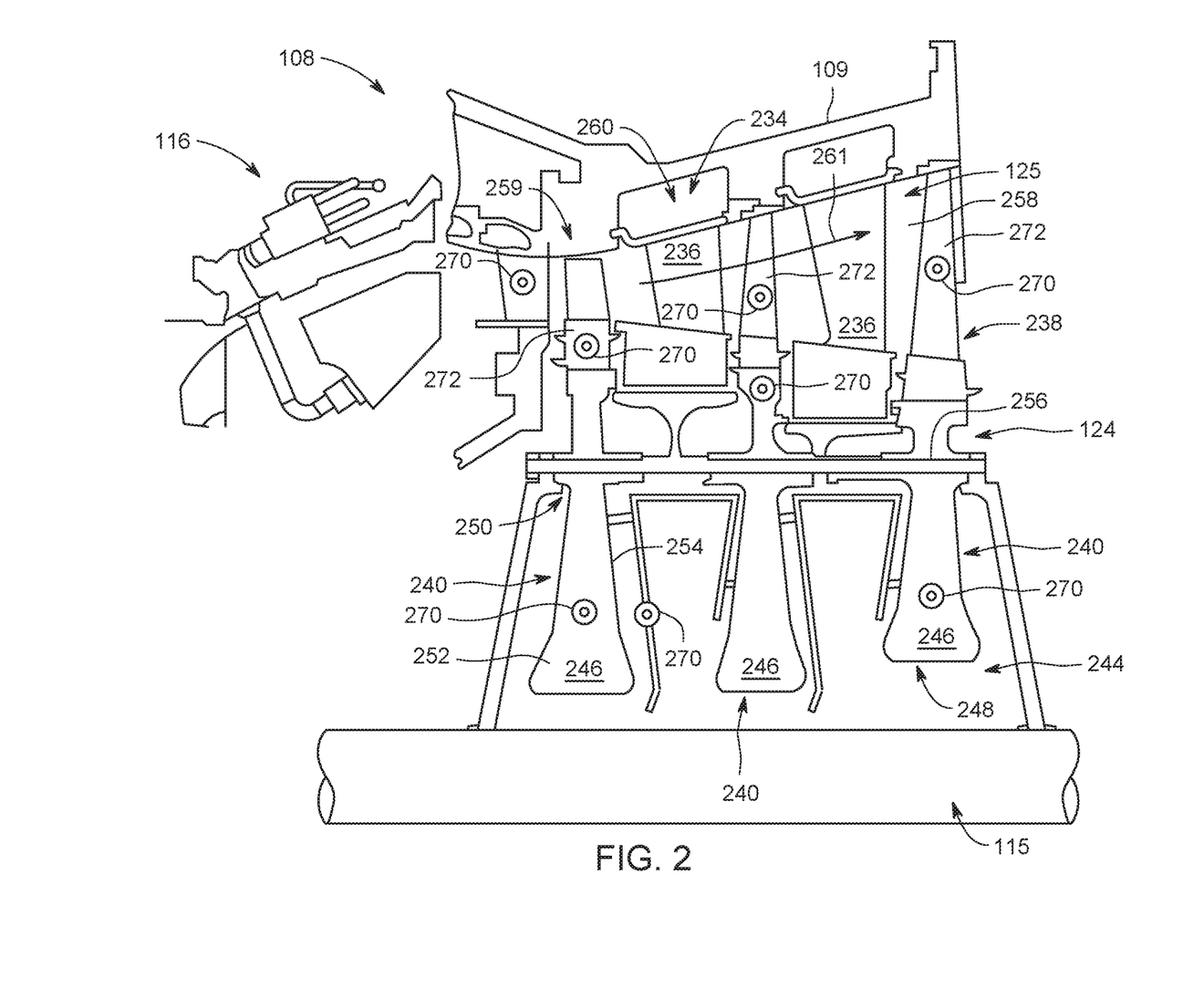
FIG. 2 is a schematic view of an exemplary rotor assembly used with the turbine engine shown in FIG. 1.

FIG. 2 is a schematic view of an exemplary rotor assembly 200 used with turbine engine 100 (shown in FIG. 1). In the exemplary embodiment, rotor assembly 200 is used within turbine section 108 and includes a plurality of stages 234 downstream of combustor 116, plurality of stages 234 including rotating rotor disk assembly 124 and a stationary nozzle assembly 125 including stator vanes 236. In the exemplary embodiment, each rotor disk assembly 124 includes a plurality of turbine blades 238 coupled to a rotor disk 240. Each rotor disk 240 is coupled to drive shaft 115. Turbine casing 109 extends circumferentially about turbine blades 238 and stator vanes 236, such that each stator vane 236 is supported by casing 109. In the exemplary embodiment, each rotor disk 240 is annular and includes a central bore 244 defined therein that extends substantially axially therethrough. More specifically, each disk body 246 extends radially outwardly from central bore 244.

In the exemplary embodiment, central bore 244 is sized to receive drive shaft 115 therethrough. Disk body 246 extends radially between a radially inner edge 248 and a radially outer edge 250, and axially from an upstream surface 252 to an opposite downstream surface 254. Each upstream surface 252 and downstream surface 254 extends between inner edge 248 and outer edge 250. An axial support arm 256 is coupled between adjacent rotor disks 240 to form turbine section 108.

Also, in the exemplary embodiment, each turbine blade 238 is coupled to disk body 246 and extends radially outwardly therefrom. In the exemplary embodiment, turbine blades 238 are spaced circumferentially about rotor disk 240. Adjacent rotor disks 240 are spaced such that a gap 258 is defined between each row 259 of circumferentially-spaced turbine blades 238. Gap 258 is sized to receive a row 260 of circumferentially-spaced stator vanes 236 that each extend inwardly from turbine casing 109 towards drive shaft 115. More specifically, in the exemplary embodiment, stator vanes 236 are spaced circumferentially about drive shaft 115 and are oriented to channel combustion gases downstream towards turbine blades 238.

Further, in the exemplary embodiment, a hot fluid path 261 is defined between turbine casing 109 and each rotor disk 240. Each row 259 and 260 of turbine blades 238 and stator vanes 236 extends at least partially through a portion of hot fluid path 261. Moreover, in the exemplary embodiment, a control system 360 (shown in FIG. 3) includes a plurality of sensors or transducers, such as sensors 270.

Moreover, in the exemplary embodiment, each sensor 270 is coupled to an exterior surface 272 of at least one turbine blade 238. More specifically, in the exemplary embodiment, sensors 270 are embedded into turbine blade 238 such that the exterior surface 272 of turbine blade 238 is substantially smooth when sensors 270 are coupled to turbine blade 238. In alternative embodiments, sensors 270 are otherwise attached to or disposed on, rather than embedded into, an exterior surface 272 of at least one turbine blade 238. In the exemplary embodiment, sensors 270 do not detect the temperature of the particular component to which sensor 270 is coupled, but rather sensors 270 detect temperature of surrounding components and surfaces. For example, in the exemplary embodiment, sensor 270 is coupled to turbine blade 238 such that sensor 270 detects at least the surface temperature of an upstream component, such as stator blade 236. In alternative embodiments, sensor 270 detects the surface temperature of additional components, such as but not limited to turbine casing 109, other turbine blades 238, drive shaft 115, and/or combustor housing 111. In the exemplary embodiment, when sensors 270 are coupled to moving components, such as turbine blade 238, sensors 270 analyze stationary components. By coupling sensors 270 to moving components, such as turbine blade 238, a more complete map of the interior of turbine 108 within the view of sensor 270 is generated, as described herein. Therefore, temperature data is taken of multiple components nearly simultaneously. These components can then be inspected and maintained in near real-time, which potentially decreases the frequency of maintenance and improves the service life of turbine engine 100. As used herein, the term "real-time" refers to at least one of the time of occurrence of the associated events, the time of measurement and collection of predetermined data, the time to process the data, and the time of a system response to the events and the environment. In contrast, other methods, such as thermocouple sensors, detect temperature at discrete points, i.e., the specific points in the turbine engine that the sensors are located, or alternatively require external sensing equipment, which may not provide a complete thermal image of the interior of the turbine engine.

In alternative embodiments, sensors 270 may be coupled to any other component of turbine engine 100 (shown in FIG. 1) that enables turbine engine 100 to function as described herein. For example, in alternative embodiments, sensors 270 are coupled to a surface 272 of stator 236 and/or disc body 246 such that sensors 270 analyze moving components of turbine 108, such as turbine blades 238. In other alternative embodiments, sensors 270 are coupled to a surface in compressor section 104, combustor section 106, exhaust 110 and/or on drive shafts 114 or 115 (shown in FIG. 1). In the exemplary embodiment, sensors 270 are micro infrared sensors. More specifically, in the exemplary embodiment, sensors 270 are micro infrared cameras. Micro infrared cameras are typically small enough and lightweight enough that the presence of sensors 270 does not substantially disturb the operation of turbine engine 100. In one example, a micro infrared camera has a weight in the range of about and including 5 grams (g) to about and including 50 grams (g) and a size in the range of about and including 5 millimeters (mm) to about and including 25 millimeters (mm) in diameter. The small size and weight relative to conventional infrared cameras allows for the integration of these temperature sensors with many gas turbine engine applications. In alternative embodiments, sensors 270 are any sensors of any weight or any size that enables turbine engine 100 to function as described herein. In the exemplary embodiment, sensors 270 each detect temperatures of components upstream of the component that sensor 270 is coupled to. In alternative embodiments, sensors 270 detect temperatures of downstream components or components in any other orientation relative to sensor 270 that enables turbine engine 100 to function as described herein. Turbine engine 100 may also include other sensors (not shown) that may transmit signals of other operating parameters of turbine engine 100 to control system 360 (shown in FIG. 3).

Although FIG. 2 illustrates the exemplary embodiment of rotor assembly 200 used within turbine section 108, in alternative embodiments, sensors 270 are coupled to internal components of other sections of turbine engine 100. As used herein, the term "internal components" includes but is not limited by rotor disk assembly 124, stationary nozzle assembly 125, stator vanes 236, turbine blades 238, rotor disk 240, drive shaft 112, 114, 115, disk body 246, a robotic arm (not shown) and any other component within compressor section 104, combustor section 106, and turbine section 108 (shown in FIG. 1). In the exemplary embodiment, sensors 270 are coupled to moving internal components and take data of stationary internal components. In alternative embodiments, sensors 270 are coupled to stationary internal components and take data of moving internal components. In further alternative embodiments, sensors 270 are coupled to any combination of internal components and take data from any other combination of internal components.

Figure 3:
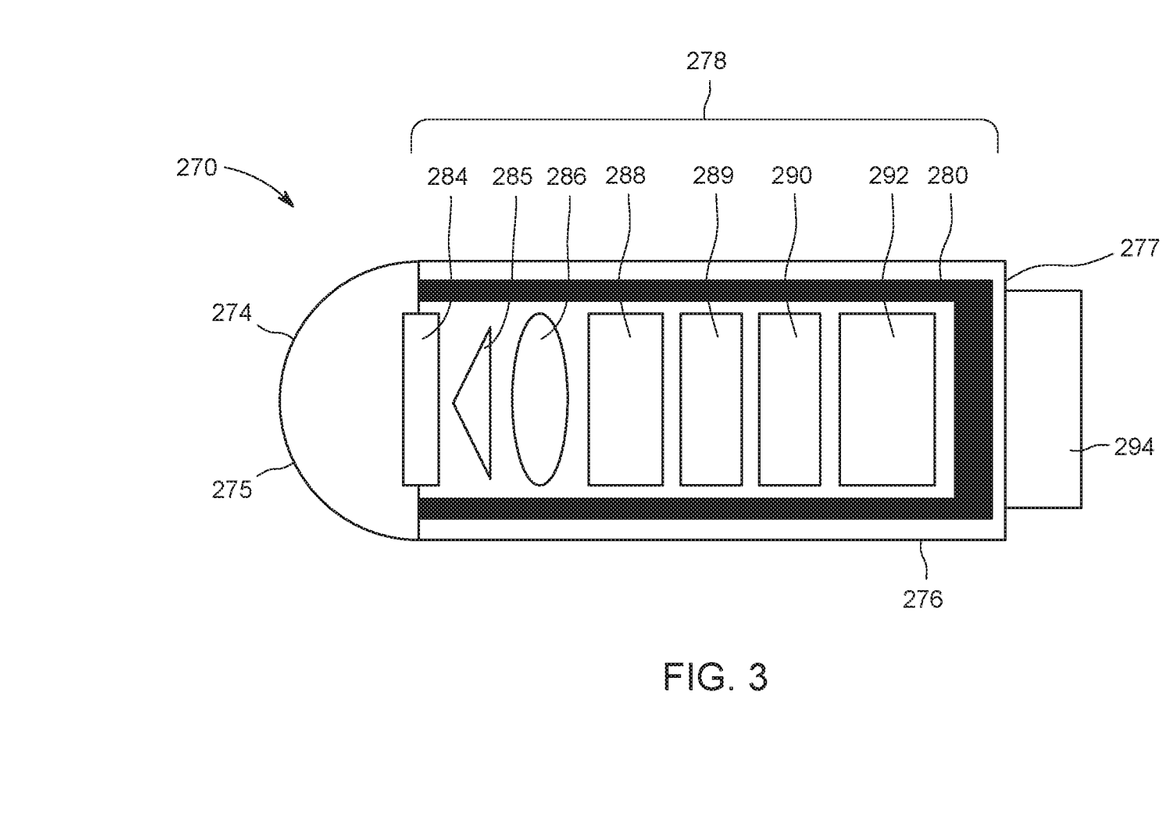
FIG. 3 is a schematic view of an exemplary sensor used with the rotor assembly shown in FIG. 2.

FIG. 3 is a schematic view of sensor 270 used with rotor assembly 200 (shown in FIG. 2). In the exemplary embodiment, sensor 270 includes an optical dome 274 at a first end 275 of sensor 270 that is coupled to a casing 276 that extends to a second end 277 of sensor 270. Casing 276 houses a plurality of sensor components 278 within sensor 270. Sensor components 278 include heat insulation 280 coupled along the periphery of casing 276. Sensor components 278 further include a filter 284, a prism 285, a plurality of lenses 286, an infrared sensor 288, also described herein as an infrared receiver 288, a system on sensor (SoS) 289, a battery 290, and a communication port 292 coupled to casing 276. Battery 290 is electrically coupled to at least infrared sensor 288 and communication port 292 to supply power to both components 288 and 292. In the exemplary embodiment, each of filter 284, at least one of a plurality of lenses 286, infrared sensor 288, battery 290, and communication port 292 are coupled to casing 276 in series from first end 275 to second end 277. In alternative embodiments, each of filter 284, at least one of a plurality of lenses 286, infrared sensor 288, battery 290, and communication port 292 are coupled to casing 276 in any order that enables sensor 270 to function as described herein.

In the exemplary embodiment, sensor 270 further includes a cooling component 294 coupled to casing 276. Cooling component 294 is any suitable heat exchanger that removes heat from sensor 270, and, more particularly, from at least one sensor component 278 within sensor 270. In the exemplary embodiment, cooling component 294 is coupled to casing 276 at second end 277 of sensor 270. In alternative embodiments, cooling component 294 is coupled to casing 276 in any configuration that enables sensor 270 to function as described herein.

In operation, light enters optical dome 274, passes through filter 284 and lenses 286, and is received by infrared sensor 288. Communication port 292 sends data from infrared sensor 288 to an external network 360, as described further herein.

Figure 4:
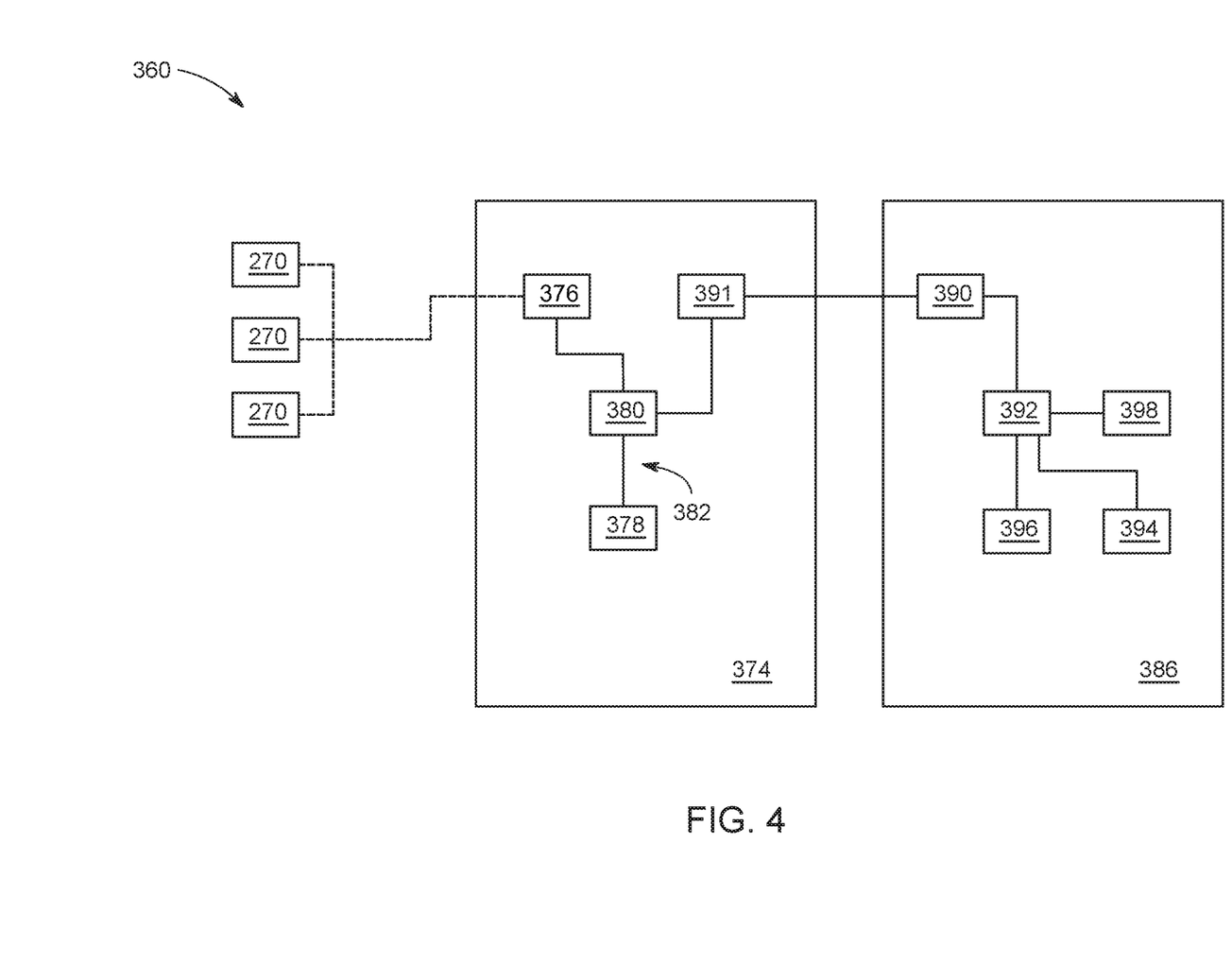
FIG. 4 is a schematic view of an exemplary microthermal imaging system used with the turbine engine shown in FIG. 1.

FIG. 4 is a schematic view of micro thermal imaging system 360 used with turbine engine 100 (shown in FIG. 1). In the exemplary embodiment, control system 360, also described herein as network 360, includes a controller 374 that is wirelessly coupled to each sensor 270, and, more particularly, to communication port 292 of each sensor 270. More specifically, controller 374 includes a sensor interface 376, also described herein as a receiver, and each sensor 270 is coupled to interface 376 via a wireless connection, such as a short-range wireless communication channel such as BLUETOOTH®. BLUETOOTH is a registered trademark of Bluetooth SIG, Inc. of Kirkland, Wash. Various other connections may also be available between sensor interface 376 and sensors 270. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE®) 1394, a parallel data connection, such as IEEE® 1284 or IEEE® 488, and/or a private (e.g., an inaccessible outside power generation system) network connection, whether wired or wireless. IEEE is a registered trademark of the Institute of Electrical and Electronics Engineers, Inc., of New York, N.Y.

In the exemplary embodiment, each sensor 270 transmits a signal corresponding to an operating parameter to controller 374, such as a temperature value or values detected by sensor 270 for the respective region in view of sensor 270. Moreover, each sensor 270 may transmit a signal continuously, periodically, or only once, for example. Other signal timings may also be contemplated. Furthermore, each sensor 270 may transmit a signal either in an analog form or in a digital form. In alternative embodiments, other sensors (not shown) within turbine engine 100 transmit signals of other operating parameters, such as but not limited to pressure, to controller 374.

Further, in the exemplary embodiment, controller 374 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 374 may be a microprocessor that includes read-only memory (ROM) and/or random access memory (RAM), such as, for example, a 32 bit microcomputer with 2 Mbit ROM and 64 Kbit RAM.

In the exemplary embodiment, controller 374 also includes a memory device 378 that stores executable instructions and/or one or more operating parameters representing and/or indicating an operating condition of turbine engine 100. For example, in the exemplary embodiment, memory device 378 stores the temperature data that is detected by sensors 270. In the exemplary embodiment, controller 374 also includes a processor 380 that is coupled to memory device 378 and sensor interface 376 via a system bus 382.

In one embodiment, processor 380 may include a processing unit, such as, without limitation, an integrated circuit (IC), an application specific integrated circuit (ASIC), a microcomputer, a programmable logic controller (PLC), and/or any other programmable circuit. Alternatively, processor 380 may include multiple processing units (e.g., in a multi-core configuration). The above examples are exemplary only, and thus are not intended to limit in any way the definition and/or meaning of the term "processor." In alternative embodiments, system on sensor 289 (shown in FIG. 2) is included within sensor 270 and performs processing and/or computing functions internal to sensor 270.

In the exemplary embodiment, control system 360 also includes a user computing device 386 that is coupled to controller 374. More specifically, user computing device 386 includes a communication interface 390 that is coupled to a communication interface 391 contained within controller 374. User computing device 386 includes a processor 392 for executing instructions. In some embodiments, executable instructions are stored in a memory device 394. Processor 392 may include one or more processing units (e.g., in a multi-core configuration). Memory device 394 is any device allowing information, such as executable instructions and/or other data, to be stored and retrieved.

User computing device 386 also includes at least one media output component 396 for use in presenting information to a user (not shown). Media output component 396 is any component capable of conveying information to the user. Media output component 396 may include, without limitation, a display device (e.g., a liquid crystal display (LCD), an organic light emitting diode (OLED) display, or an audio output device (e.g., a speaker or headphones)).

Moreover, in the exemplary embodiment, user computing device 386 includes an input interface 398 for receiving input from the user. In some embodiments, input interface 398 includes, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of media output component 396 and input interface 398.

The above described micro thermal imaging system overcomes several deficiencies associated with known temperature sensing systems for rotary machines. The micro thermal imaging system described herein facilitates the measurement of the temperature of various components of a gas turbine engine. The system described herein includes a plurality of micro infrared cameras embedded into components of the gas turbine engine. In at least one embodiment, the system includes a plurality of micro infrared cameras embedded into moving components of the gas turbine engine. As the moving components rotate or translate, the micro infrared cameras take data on the thermal activity of the gas turbine engine, and provide a nearly complete map of the surface temperature of the various components. The data gathered can then be wirelessly transmitted to an external receiver for analysis, providing thermal feedback to a user in near real-time.

An exemplary technical effect of the methods, system, and apparatus described herein includes at least one of: (a) integrating temperature sensors within gas turbine components that measure temperature beyond discrete points on the component surface; (b) enabling temperature measurements of the internal components without involving external sensing equipment, e.g., via a conventional infrared camera and borescope; (c) enabling measuring the surface temperature of multiple components nearly simultaneously, especially when micro infrared sensors are coupled to moving parts internal to the turbine engine; (d) enabling inspection of the internal components of the turbine engine in near real-time, which potentially decreases the frequency of maintenance and improves the service life of the turbine engine.

Exemplary embodiments of a micro thermal imaging system are described above in detail. The micro thermal imaging system and methods of manufacturing or operating such a system and device are not limited to the specific embodiments described herein, but rather, components of systems and/or steps of the methods may be utilized independently and separately from other components and/or steps described herein. For example, the systems, apparatus, and methods may also be used in combination with other types of machines that include rotating or translating parts, and are not limited to practice with only the micro thermal imaging system described herein. Rather, the exemplary embodiment can be implemented and utilized in connection with many other applications, equipment, and systems that may benefit from using a Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A turbine engine comprising:
   a compressor section;
   a combustor section having a combustor housing that is fluidly coupled to the compressor section;
   a turbine section fluidly coupled to the combustor section, the turbine section including turbine blades that rotate within the turbine section;
   a drive shaft coupled to the turbine section and the compressor section; and
   at least one infrared sensor attached to at least one exterior surface of the turbine section, said at least one infrared sensor configured to detect a surface temperature of one or more of the combustor housing or the drive shaft while the turbine blades rotate within the turbine section.

2. The turbine engine in accordance with claim 1, wherein the at least one infrared sensor comprises a casing, an optical dome, an infrared receiver, a filter, at least one lens, and a communications port coupled to the casing, the communications port configured to send data from the infrared receiver to a controller in a thermal imaging system.

3. The turbine engine in accordance with claim 1, wherein the at least one infrared sensor is configured to detect the surface temperature of the one or more of the combustor housing or the drive shaft in a location that is upstream of the at least one infrared sensor.

4. The turbine engine in accordance with claim 1, wherein the at least one infrared sensor is attached to an exterior surface of at least one of the turbine blades, wherein the at least one infrared sensor is configured to detect the surface temperature of the combustor housing that is stationary relative to the turbine blades while the at least one of the turbine blades and the at least one infrared sensor moves.

5. The turbine engine in accordance with claim 1, wherein the at least one infrared sensor is embedded into a surface of at least one of the turbine blades.

6. The turbine engine in accordance with claim 1, wherein the at least one infrared sensor is a micro infrared sensor.

7. A method of manufacturing a turbine engine comprising:
   fluidly coupling a compressor section with a combustor housing;
   fluidly coupling a turbine section having rotatable turbine blades with the combustor section;
   coupling a drive shaft to the turbine section and the compressor section;
   attaching at least one infrared sensor to at least one exterior surface of the turbine section, the at least one infrared sensor attached to the at least one exterior surface to detect a surface temperature of one or more of the combustor housing or the drive shaft while the turbine blades rotate.

8. The method in accordance with claim 7, wherein the at least one infrared sensor includes an optical dome coupled to a casing, an infrared receiver coupled to the casing and configured to capture light through the optical dome, a filter, at least one lens, and a communications port configured to send data from the infrared receiver to an external network.

9. The method in accordance with claim 7, wherein attaching the at least one infrared sensor to the at least one exterior surface of the turbine section further includes embedding the at least one infrared sensor in a surface of the at least one of the turbine blades.

10. The method in accordance with claim 7, wherein attaching the at least one infrared sensor to the at least one exterior surface of the turbine section further includes positioning the at least one infrared sensor such that the at least one infrared sensor detects the surface temperature of the one or more of the combustor housing or the drive shaft in a location that is upstream of the at least one infrared sensor.

11. The method in accordance with claim 7, wherein the at least one infrared sensor is a micro infrared sensor.

12. A turbine engine comprising:
turbine blades configured to rotate a drive shaft; and
an infrared sensor embedded within one or more of the turbine blades, wherein the infrared sensor is configured to measure a temperature of one or more surfaces inside the turbine engine while the turbine blades and the infrared sensor are moving,
wherein the infrared sensor is configured to measure the temperature of another moving component while the turbine blades and the infrared sensor are moving.

13. The turbine engine of claim 12, further comprising a turbine casing in which the turbine blades are disposed, wherein the infrared sensor is configured to measure the temperature inside the turbine casing.

14. The turbine engine of claim 12, wherein the infrared sensor is embedded in a first turbine blade of the turbine blades and is configured to measure the temperature of another, second turbine blade of the turbine blades.

15. The turbine engine of claim 12, wherein the infrared sensor comprises an optical dome, an infrared receiver, and a communications port configured to send data from the infrared receiver to a controller in a thermal imaging system.

16. The turbine engine of claim 12, wherein the infrared sensor is configured to measure the temperature of a stationary component other than a combustor housing while the turbine blades and the infrared sensor are moving.

17. The turbine engine of claim 12, wherein the infrared sensor is configured to measure the temperature of one or more of a stator blade, at least one of the turbine blades, or a casing while the infrared sensor is moving.

* * * * *